(12) United States Patent
Cho et al.

(10) Patent No.: US 11,697,324 B2
(45) Date of Patent: Jul. 11, 2023

(54) ROOF VENT

(71) Applicants: HYUNDAI MOTOR COMPANY, Seoul (KR); KIA MOTORS CORPORATION, Seoul (KR); NIFCO KOREA Inc., Asan-si (KR); DAEHAN SOLUTION CO., LTD., Incheon (KR)

(72) Inventors: Min Ho Cho, Suwon-si (KR); Jin Ho Hwang, Seoul (KR); Hye Kyung Kim, Suwon-si (KR); Seung Hyeok Chang, Suwon-si (KR); Choong Ho Kwon, Seoul (KR); Geun Heung Kim, Asan-si (KR); Woo Hyuk Kim, Asan-si (KR); Soon Kyu Lee, Incheon (KR)

(73) Assignees: HYUNDAI MOTOR COMPANY, Seoul (KR); KIA MOTORS CORPORATION, Seoul (KR); NIFCO KOREA INC., Asan-si (KR); DAEHAN SOLUTION CO., LTD., Incheon (KR)

( * ) Notice: Subject to any disclaimer, the term of this patent is extended or adjusted under 35 U.S.C. 154(b) by 257 days.

(21) Appl. No.: 16/691,285

(22) Filed: Nov. 21, 2019

(65) Prior Publication Data
US 2020/0369122 A1 Nov. 26, 2020

(30) Foreign Application Priority Data
May 21, 2019 (KR) .................. 10-2019-0059183

(51) Int. Cl.
*B60J 7/08* (2006.01)
*B60J 7/00* (2006.01)
(Continued)

(52) U.S. Cl.
CPC ............. *B60H 1/262* (2013.01); *B60H 1/245* (2013.01); *B60J 7/1642* (2013.01);
(Continued)

(58) Field of Classification Search
CPC ................... B60H 1/262; B60H 1/245; B60H 2001/3471; B60H 1/249; B60H 1/00742;
(Continued)

(56) References Cited

U.S. PATENT DOCUMENTS 4,068,408 A * 1/1978 Hauber ................... E05F 11/24
49/354
4,104,825 A * 8/1978 Hosmer ................. B60J 7/1642
160/369

(Continued)

FOREIGN PATENT DOCUMENTS

DE         4124476 A1      1/1993
DE    202017000167 U1  *  4/2017   ............. B60H 1/245
(Continued)

OTHER PUBLICATIONS

Capkin, Capkin Espacenet Machine Translation, Apr. 2017, German Patent Office (Year: 2017).*

*Primary Examiner* — Steven B McAllister
*Assistant Examiner* — Cole N Friedman
(74) *Attorney, Agent, or Firm* — Lempia Summerfield Katz LLC

(57) ABSTRACT

A roof vent includes a roof disposed on a vehicle and a vent assembly. The vent assembly includes at least one vent unit disposed on the roof and configured to be popped up to the interior of the vehicle, a driving unit driving the vent unit, and at least one rack unit applying driving force of the driving unit to the vent unit. The vent unit is popped up or tilted by the driving unit.

9 Claims, 4 Drawing Sheets

(51) Int. Cl.
*B60H 1/26* (2006.01)
*B60H 1/24* (2006.01)
*B60J 7/16* (2006.01)
*B60H 1/34* (2006.01)
*B60H 1/00* (2006.01)

(52) U.S. Cl.
CPC .. *B60H 1/00742* (2013.01); *B60H 2001/3471* (2013.01); *E05Y 2900/542* (2013.01)

(58) Field of Classification Search
CPC ............ B60H 1/00792; B60H 1/00821; B60H 2001/00235; B60H 2001/00121; B60J 7/08; B60J 7/1642; B60J 7/0061; B60J 7/226; B60J 7/165; B60J 7/1657; B60J 7/1635; B60J 7/1628; B60J 7/1614; B60J 7/057; B60J 7/00; B60J 7/22; B60J 7/16; B60J 7/0573; B60J 7/043; B60J 7/047; B60J 10/82; B60J 10/80; B60J 7/19; B60J 7/196; B60J 7/194; B60J 7/024; B60J 1/14; B60J 7/028; B60J 7/1678; E05Y 2900/542; E05Y 2900/538; E05Y 2800/102; E05Y 2600/11; E05Y 2600/14; E05Y 2800/296; E05Y 2201/71; E05Y 2201/694; E05Y 2201/624; E05D 15/0621; E05D 15/30; E05D 7/06; Y10T 74/18056; Y10T 16/5448; Y10T 403/32081; F16H 21/02; F16H 21/00; F16H 5/00; F16H 21/10; F16H 21/04; F16H 21/14; F16H 1/003; F16H 35/08; F16H 21/36; E05C 9/046; E05F 7/02; E05F 15/678; E05F 15/697; E05F 15/63; F16C 11/04; F16C 7/02
USPC ...... 454/137, 161, 4; 49/324, 344, 346, 339, 49/340, 341, 342, 351; 296/223
See application file for complete search history.

(56) References Cited

U.S. PATENT DOCUMENTS

| | | | | |
|---|---|---|---|---|
| 4,143,556 | A * | 3/1979 | Hauber | E05F 11/24 49/324 |
| 4,193,618 | A * | 3/1980 | Lee | B60J 7/0573 292/35 |
| 4,210,277 | A * | 7/1980 | Kolt | F24F 11/76 236/49.5 |
| 4,647,105 | A * | 3/1987 | Pollard | B60J 7/05 296/222 |
| 4,802,307 | A * | 2/1989 | Schmidt | E05D 15/1015 49/130 |
| 4,943,104 | A * | 7/1990 | Zani | B60J 7/057 292/263 |
| 5,775,028 | A * | 7/1998 | Lambert | E05D 15/30 49/248 |
| 6,347,484 | B1 | 2/2002 | Swanger | |
| 6,527,337 | B2 * | 3/2003 | Farber | B60J 7/041 296/220.01 |
| 7,178,862 | B2 * | 2/2007 | Oechel | B60J 7/024 296/216.02 |
| 7,464,619 | B2 * | 12/2008 | Vetter | E05F 11/16 74/400 |
| 8,950,115 | B2 * | 2/2015 | Andersson | E06B 5/00 49/212 |
| 2007/0163747 | A1 | 7/2007 | Baro et al. | |
| 2007/0182219 | A1 * | 8/2007 | Mori | B60J 7/0573 296/223 |
| 2008/0139101 | A1 | 6/2008 | Bickel et al. | |

FOREIGN PATENT DOCUMENTS

| | | |
|---|---|---|
| KR | 970057496 U | 11/1997 |
| KR | 20040003433 A | 1/2004 |
| WO | 2017175034 A1 | 10/2017 |

\* cited by examiner

SECOND REGION    FIRST REGION

ROOF VENT

CROSS-REFERENCE TO RELATED APPLICATION

This application claims under 35 U.S.C. § 119(a) the benefit of priority to Korean Patent Application No. 10-2019-0059183 filed on May 21, 2019, the entire contents of which are incorporated herein by reference.

BACKGROUND

(a) Technical Field

The present disclosure relates to a roof vent. More particularly, it relates to a roof vent that is disposed on the roof of a vehicle so as to realize popup and tilting operations in response to a user's request, thereby making the interior of a vehicle communicate with the outside, circulating or introducing air, and adjusting an airflow direction in accordance with a user selection.

(b) Background Art

In general, a vehicle is an apparatus that moves on land and is a representative means of transportation that is mainly used for people to travel.

A vehicle is provided with a passenger compartment (hereinafter referred to as an "interior of the vehicle") in which passengers ride. In general, the interior of the vehicle is designed to be hermetically sealed from the outside in order to provide a comfortable riding environment for passengers.

Therefore, it is necessary to appropriately ventilate the interior of the vehicle. A generally used ventilation method is to introduce external air into the interior of the vehicle while the vehicle is moving.

However, the amount of air flowing into the vehicle while the vehicle is moving is too small to sufficiently ventilate the interior of the vehicle, which may have a bad influence on the health of the passengers in the case of long-duration travel.

Further, because air is not uniformly introduced into the entire interior of the vehicle, only passengers who are located near the roof vent may receive ventilated air.

The above information disclosed in this Background section is only to enhance the understanding of the background of the disclosure. Therefore, the Background section may contain information that does not form the prior art that is already known in this country to a person of ordinary skill in the art.

SUMMARY OF THE DISCLOSURE

The present disclosure has been made in an effort to solve the above-described problems associated with the prior art. It is an object of the present disclosure to provide a roof vent capable of uniformly introducing air into the interior of a vehicle.

It is another object of the present disclosure to provide a roof vent capable of selectively realizing a popup or tilting operation in response to a passenger's request, thereby adjusting an airflow direction so that air also flows to a region distant from the roof vent.

It is a further object of the present disclosure to provide a roof vent capable of realizing a popup or tilting operation so that air flows to a selected position or to a selected passenger.

In one aspect, the present disclosure provides a roof vent including a roof disposed at an upper side of an interior of a vehicle and including a vent assembly. The vent assembly includes at least one vent unit protruding outside the roof, a driving unit applying driving force to the vent unit, and at least one rack unit applying driving force of the driving unit to the vent unit, wherein the vent unit is popped up by the driving unit.

In an embodiment, the roof vent may include a first rack unit to which driving force of the driving unit is applied, a second rack unit interlocking with the first rack unit, a first slot formed in the back surface of the vent unit to allow one end of the first rack unit to move to one end of the vent unit in a longitudinal direction thereof, and a second slot formed in the back surface of the vent unit to allow one end of the second rack unit to move to the opposite end of the vent unit in the longitudinal direction thereof. The vent unit may be popped up outside the roof by operation of the first rack unit.

In another embodiment, the at least one vent unit may include a plurality of vent units, the vent assembly may include a windless unit disposed between the vent units, and the vent units and the windless unit may be arranged in a longitudinal direction of the vehicle.

In still another embodiment, the at least one vent unit may include a plurality of vent units, the vent assembly may include a windless unit disposed between the vent units, and the vent units and the windless unit may be formed symmetrically in a width direction of the vehicle.

In yet another embodiment, the roof vent may further include a link part formed on the back surface of the vent unit, and a guide slot formed in the roof to guide a popup operation of the link part.

In still yet another embodiment, the guide slot may include a first guide slot formed vertically in a straight-line shape to guide movement of the link part when the vent unit is popped up, and may include a second guide slot extending from one end of the first guide slot, the second guide slot being formed in a curved-line shape to guide movement of the link part when the vent unit is tilted.

In a further embodiment, the first slot may include a first popup position portion in which one end of the first rack unit is located when the vent unit is popped up.

In another further embodiment, the first slot may further include a first curved portion extending from at least one end of the first popup position portion. The one end of the first rack unit may be located in the first curved portion when the vent unit is tilted.

In still another further embodiment, the second slot may include a second popup position portion in which one end of the second rack unit is located when the vent unit is popped up.

In yet another further embodiment, the second slot may further include a second curved portion extending from at least one end of the second popup position portion. The one end of the second rack unit may be located in the second curved portion when the vent unit is tilted.

In still yet another further embodiment, the roof vent may further include a position sensor detecting a position of a passenger. The roof vent may also include a controller configured to receive a detection value from the position sensor and to control operation of an air-conditioning system in accordance with the detected position of the passenger.

In another aspect, the present disclosure provides a roof vent including a roof disposed on the ceiling of a vehicle and at least one vent unit disposed on the roof. The vent unit is configured to be popped up to an interior of the vehicle. The roof vent also includes a transmission unit driving the vent unit, an operating unit engaged with one side of the transmission unit to apply driving force to the transmission unit in order to cause the vent unit to be popped up, and an adjusting unit adjusting a tilting operation of the vent unit that has been popped up.

In an embodiment, the roof vent may further include a guide rod integrally formed with the transmission unit. The guide rod may be configured to move along a guide groove formed in the back surface of the vent unit.

In another embodiment, the roof vent may further include an adjusting ball disposed on one end of the transmission unit. The adjusting unit may be coupled to the adjusting ball to adjust an inclination of the vent unit.

Other aspects and embodiments of the disclosure are discussed hereinbelow.

It should be understood that the term "vehicle" or "vehicular" or other similar term as used herein is inclusive of motor vehicles in general, such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power such as, for example, vehicles that are both gasoline-powered and electric-powered.

The above and other features of the disclosure are discussed hereinbelow.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus are not limitative of the present disclosure, and wherein.

Figure 1:
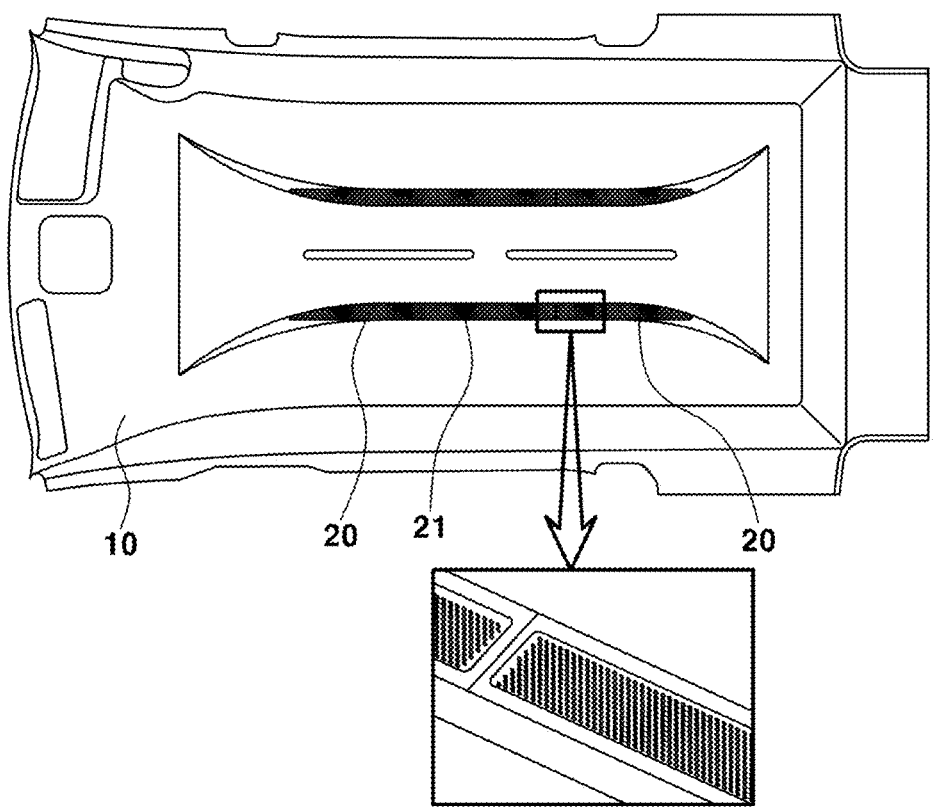
FIG. 1 is a plan view of a roof including a roof vent according to an embodiment of the disclosure.

It should be understood that the appended drawings are not necessarily to scale, presenting a somewhat simplified representation of various features illustrative of the basic principles of the disclosure. The specific design features of the embodiments as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

The present disclosure is now described more fully with reference to the accompanying drawings, in which embodiments of the disclosure are shown. This disclosure may, however, be embodied in many different forms, and should not be construed as being limited to the embodiments set forth herein. Rather, these embodiments are provided so that this disclosure will be thorough and complete and will fully convey the scope of the disclosure to those of ordinary skill in the art.

The terms "part" and "assembly" used in the specification mean units for processing at least one function or operation, which can be implemented by hardware components, software components, or combinations thereof.

Further, it will be understood that terms such as "first" and "second" are only used to distinguish one element from another element. The essence, order, or sequence of corresponding elements are not limited by these terms.

The term "popup" used hereinbelow means that a vent assembly is moved downwards into the interior of the vehicle while being maintained in a horizontal state, i.e. parallel to the roof.

The term "tilting" used hereinbelow means that the vent assembly is moved downwards at an incline into the interior of the vehicle. Here, the present disclosure is not limited as to the specific downward inclination direction or downward inclination angle of the vent assembly.

A roof vent according to an embodiment of the present disclosure includes a roof 10, a vent assembly 20, a driving unit 300, a first rack unit 400, a second rack unit 500, a first slot 600, and a second slot 700.

FIG. 1 is a plan view of a roof of a vehicle including a vent device according to an embodiment of the disclosure.

As shown in the drawing, the roof vent of the present disclosure includes a roof 10 and a vent assembly 20.

At least one vent assembly 20 may be provided in the roof 10. According to the embodiment of the present disclosure, vent assemblies 20 may be disposed so as to be symmetrical to each other in a width direction of the vehicle and may be located at positions corresponding to a driver's seat and a front passenger seat and at positions corresponding to respective rear passenger seats.

An air-conditioning system (not shown) may be provided in the vehicle in order to heat or cool internal or external air and to introduce or circulate the heated or cooled air into or in the interior of the vehicle. The indoor temperature is maintained at an appropriate level and a comfortable riding environment for passengers is provided.

The air-conditioning system may include a roof duct, which communicates with a pillar duct and discharges the air-conditioned air, and a floor duct, which is mounted in the floor of the vehicle and discharges the air-conditioned air. The vent assembly of the present disclosure, which is disposed in the roof 10, is configured so as to be fluidically connected to the air-conditioning system of the vehicle via the roof duct.

The roof 10 may include a roof panel (not shown) and a roof lining (not shown). The roof duct may be mounted in the roof panel or may be mounted between the roof panel and the roof lining. The roof duct may serve to uniformly distribute air for cooling or heating to the interior of the vehicle.

Further, the air-conditioning system and the roof duct may be configured so as to be fluidically connected to each other via at least one pillar.

Furthermore, the vent assembly 20 may include at least one vent unit 200, which is located in the roof 10 and is configured to realize a popup or tilting operation.

The vent unit 200 of the present disclosure may realize a popup operation such that it is moved downwards into the interior of the vehicle while being maintained in a horizontal state, i.e. parallel to the roof 10 of the vehicle. Alternatively, the vent unit 200 may realize a tilting operation such that it is tilted toward a driver's seat or a passenger seat located in the interior of the vehicle.

The vent unit 200 may allow a large amount of external air (air or wind) to flow into the interior of the vehicle during ventilation. Further, the vent unit 200 may be opened or closed by a passenger who desires air circulation or who desires to change the indoor atmosphere.

In addition, the vent assembly 20 may include a windless unit 21, which is provided between the vent units 200.

The windless unit 21 may include at least one fine hole formed therein. When the vent unit 200 is not used, the windless unit 21 may generate weak flow of air introduced through the roof duct mounted in the roof 10 and may realize indirect blowing of air to the interior of the vehicle.

Therefore, it is possible to diffuse the air introduced from the air-conditioning system to a passenger who does not want the opening/closing operation of the vent unit 200, i.e. the popup or tilting operation thereof, through the windless unit 21.

The windless unit 21 of the present disclosure may be located between the vent units 200, which are arranged in the longitudinal direction of the vehicle. Each vent unit 200 may include a plate, and the plate of the vent unit 200 may include a fine hole formed therein, like the windless unit.

Since the plate of the vent unit 200 includes a fine hole formed therein to generate weak flow of air, the vent unit 200 may realize indirect blowing of air without performing the popup or tilting operation.

In other words, the vent unit 200 may be coupled to the roof duct so as to exhibit the same function as the windless unit 21 when the vent unit 200 does not perform the popup or tilting operation. The vent unit 200 may have formed therein at least one fine hole that is the same as that in the windless unit 21.

Thus, even when the vent unit 200 does not perform the popup operation, the vent unit 200 may perform the same function as the windless unit 21 through the vent assembly 20.

Figure 2:
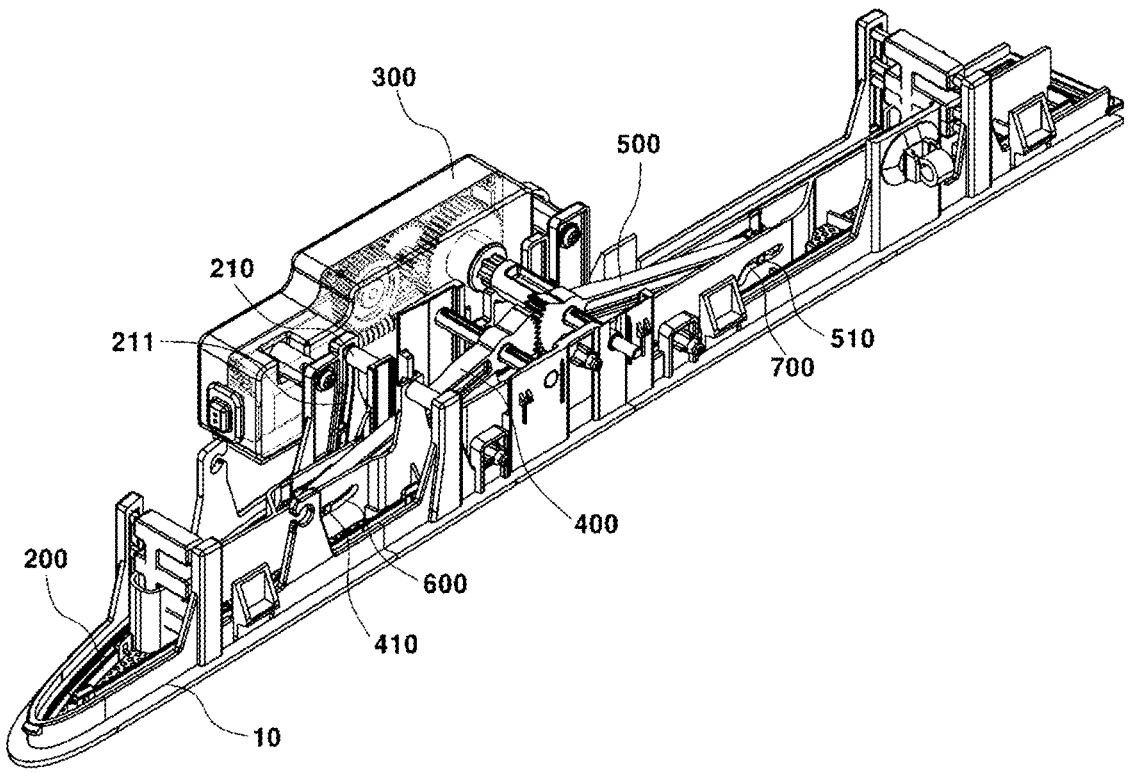
FIG. 2 is a perspective view showing a vent assembly of the roof vent shown in FIG. 1.

FIG. 2 is a view showing the vent assembly of the roof vent shown in FIG. 1.

As shown in the drawing, the driving unit 300 may be mounted in the roof 10 or to one side of the vent assembly 20 to drive at least one of the first rack unit 400 or the second rack unit 500. The driving unit 300 may be implemented as a motor to rotate at least one of the first rack unit 400 or the second rack unit 500.

The first rack unit 400 may be disposed on the back surface of the vent unit 200. The first rack unit 400 may be connected to one end of the driving unit 300 to receive driving force and may be operated to cause the popup or tilting operation of the vent unit 200.

The second rack unit 500 may be disposed adjacent to one end of the first rack unit 400 so as to interlock with the first rack unit 400. Specifically, the second rack unit 500 may be in contact with one end of the first rack unit 400 that is connected to the driving unit 300, whereby the driving force transmitted to the first rack unit 400 may also be applied to the second rack unit 500 at the same time. Thus, the second rack unit 500 may be operated to cause the popup or tilting operation of the vent unit 200.

In other words, the first rack unit 400 and the second rack unit 500 are driven together by a single driving unit 300. To this end, the end of the first rack unit 400 and the end of the second rack unit 500 that face each other mesh with each other through gear coupling.

In one embodiment of the present disclosure, any one of the first rack unit 400 and the second rack unit 500 may be connected to one side of the driving unit 300 such that the driving force of the driving unit 300 is applied either to the first rack unit 400 or to the second rack unit 500.

The first slot 600 is formed in one end portion of the vent unit 200. A first projection 410, which is formed at the opposite end of the first rack unit 400, is inserted into the first slot 600 so that the opposite end of the first rack unit 400 moves along the first slot 600 in a sliding manner.

Figure 3:
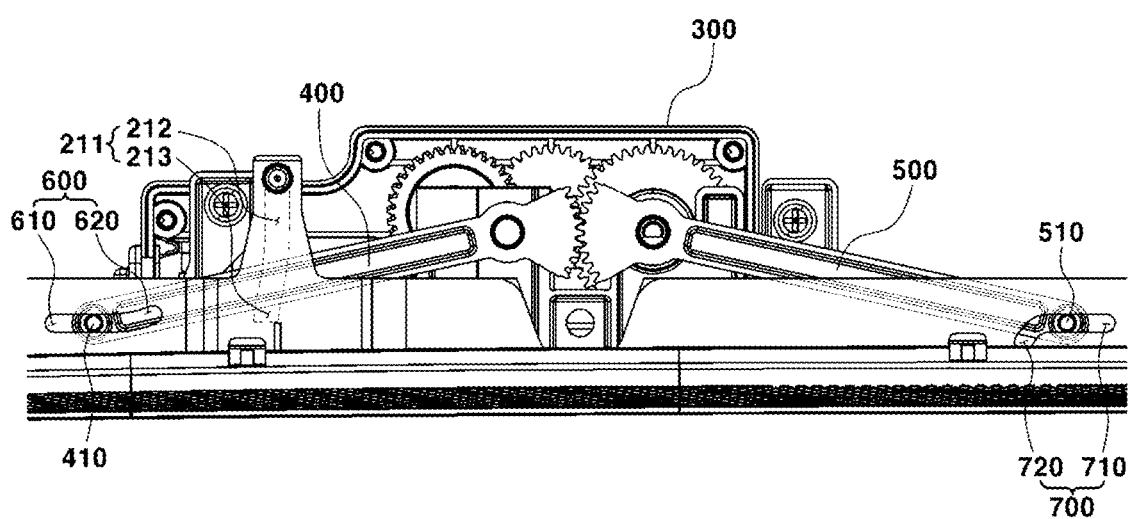
FIG. 3 is a view showing the state in which a vent unit performs a popup operation in the vent assembly shown in FIG. 2.

Referring to FIGS. 2 and 3, the first slot 600 may include a first popup position portion 610, which is formed in a horizontal direction, i.e. parallel to the roof 10, and may include a first curved portion 620, which is formed so as to guide the vent unit 200 to perform a tilting operation. Here, the first popup position portion 610 is formed such that the first projection 410 of the first rack unit 400 is located therein when the vent unit 200 performs a popup operation.

Further, the first curved portion 620 is formed such that the first projection 410 of the first rack unit 400 is located therein when the vent unit 200 performs a tilting operation.

The second slot 700 is formed in the opposite end portion of the vent unit 200. A second projection 510, which is formed at the opposite end of the second rack unit 500, is inserted into the second slot 700 so that the opposite end of the second rack unit 500 moves along the second slot 700 in a sliding manner.

The second slot 700 may include a second popup position portion 710, which is formed in a horizontal direction, i.e. parallel to the roof 10, and may include a second curved portion 720, which is formed so as to guide the vent unit 200 to perform a tilting operation. Here, the second popup position portion 710 is formed such that the second projection 510 of the second rack unit 500 is located therein when the vent unit 200 performs a popup operation.

Further, the second curved portion 720 is formed such that the second projection 510 of the second rack unit 500 is located therein when the vent unit 200 performs a tilting operation.

Furthermore, the first curved portion 620 and the second curved portion 720, in which the first projection and the second projection are respectively located when the vent unit 200 performs a tilting operation, may be formed so as to be curved with predetermined curvatures in directions opposite each other, e.g. in the upward direction and in the downward direction. The curvatures of the first curved portion 620 and the second curved portion 720 may be set in accordance with the degree to which the vent unit 200 is tilted.

The vent unit 200 may be provided on the back surface thereof with at least one link part 210. The link part 210 may move along a guide slot 211 formed in the roof 10.

Specifically, when the vent unit 200 performs a popup operation, the link part 210 may move along the guide slot 211.

When the vent unit 200 performs a popup operation, the link part 210 may serve to restrict the vent unit 200 so as to prevent shaking of the vent unit 200 and maintain and fix the vent unit 200 in a horizontal state.

At least one guide slot 211 may be formed. In one embodiment of the present disclosure, two guide slots 211 are formed. Each of the guide slots 211 includes a first guide slot 212, which is formed in an upper region, and a second guide slot 213, which is formed in a lower region.

The first guide slot 212 may be located at the upper portion of the guide slot 211 and may be formed in a straight-line or linear shape in the height direction of the vehicle. The second guide slot 213 may extend downwards from the first guide slot 212 and may be formed in a curved-line or curved shape.

Further, the second guide slot 213 may be formed with a predetermined curvature that substantially corresponds to the curvatures of the first curved portion 620 and the second curved portion 720.

FIG. 3 is a view showing the state in which the vent unit 200 performs a popup operation in the vent assembly shown in FIG. 2.

As shown in the drawing, when the vent unit 200 performs a popup operation, the first rack unit 400, which is linked to the first slot 600, may be located in the first popup position portion 610, and the second rack unit 500, which is linked to the second slot 700, may be located in the second popup position portion 710.

Further, when the first rack unit 400 is located in the first popup position portion 610 of the first slot 600, the link part 210 may be located in the first guide slot 212.

Thus, the vent unit 200 may be located parallel to the roof and may be maintained and fixed parallel to the roof by the link part 210.

In other words, when the vent unit 200 performs a popup operation, the first projection 410 of the first rack unit 400 moves along the first popup position portion 610 of the first slot 600. The second projection 510 of the second rack unit 500 moves along the second popup position portion 710 of the second slot 700.

Further, the first projection 410 and the second projection 510 may be formed at positions corresponding to each other such that when the first projection 410 is located in the first popup position portion 610, the second projection 510 is located in the second popup position portion 710.

Furthermore, when the first projection 410 and the second projection 510 are respectively located in the first popup position portion 610 and the second popup position portion 710, the link part 210 may be located in the first guide slot 212.

Figure 4:
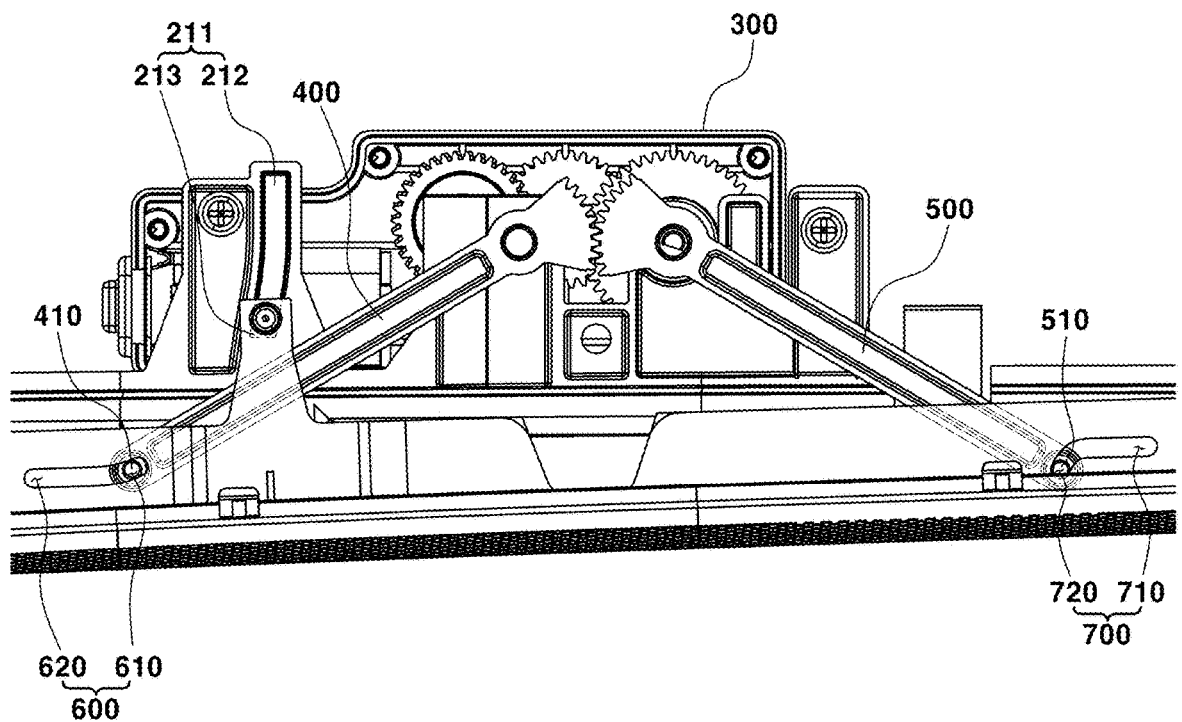
FIG. 4 is a view showing the state in which the vent unit performs a tilting operation in the vent assembly shown in FIG. 2.
Figure 5:
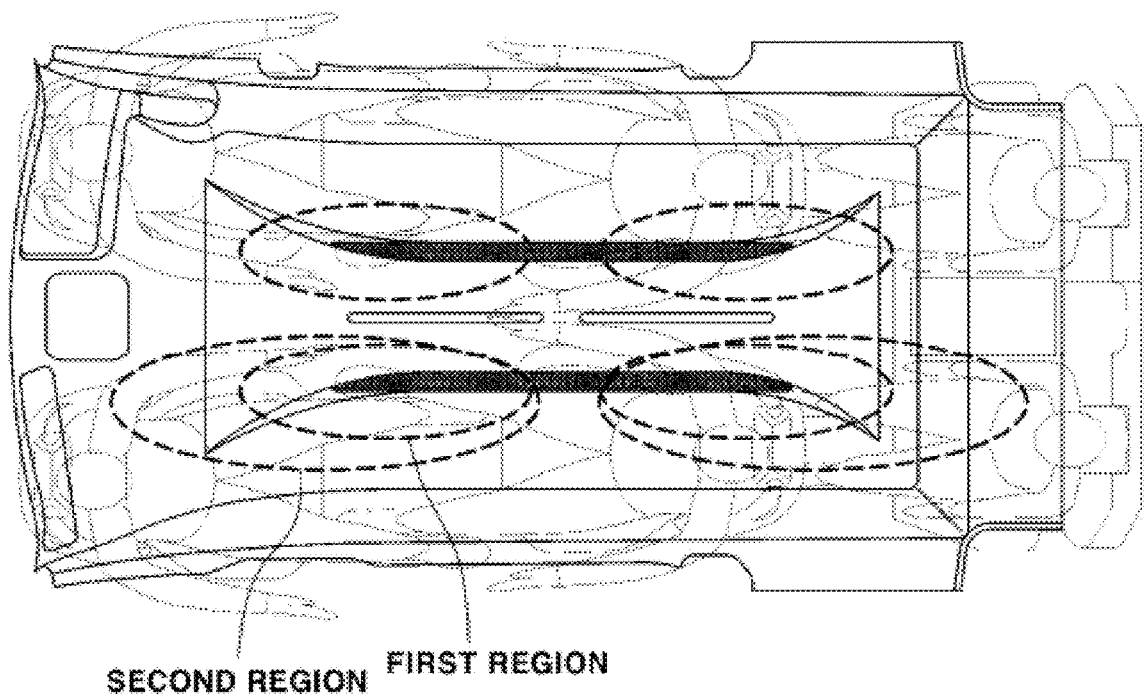
FIG. 5 is a view showing the directions in which air flows in accordance with the popup or tilting operation of the vent unit shown in FIG. 2.

FIG. 4 is a view showing the state in which the vent unit 200 performs a tilting operation in the vent assembly shown in FIG. 2. FIG. 5 is a view showing the directions in which air is introduced into the interior of the vehicle in accordance with the popup or tilting operation of the vent unit 200 shown in FIG. 2.

As shown in the drawings, when the vent unit 200 performs a tilting operation, the first rack unit 400 may be located in the first curved portion 620 of the first slot 600 so that vent unit 200 is tilted at a predetermined angle. Further, the second rack unit 500, which is linked to the second slot 700, may be located in the second curved portion 720, which is formed so as to correspond to the first curved portion 620.

As described above, the first curved portion 620 and the second curved portion 720 are formed so as to be curved in directions symmetrical to each other. Specifically, the first curved portion 620 is curved in the upward direction and the second curved portion 720 is curved in the downward direction.

Thus, when the vent unit 200 is tilted, the first rack unit 400 may be located in the first curved portion 620 and may move along the first curved portion 620 in the upward direction. Also, the second rack unit 500 may be located in the second curved portion 720 and may move along the second curved portion 720 in the downward direction.

The shapes of the first and second curved portions 620 and 720 may be set in accordance with the direction in which the vent unit 200 is tilted. In one embodiment of the present disclosure, the first and second curved portions 620 and 720 may be formed such that the front end of the vent unit 200, which is disposed near the windshield of the vehicle, is tilted, and such that the rear end of the vent unit 200, which is disposed near the rear side of the vehicle, is tilted.

In other words, the first curved portion 620 and the second curved portion 720 may be formed in accordance with the positions of a plurality of vent units 200 such that the popup amount of one end of each vent unit 200 is greater than that of the opposite end thereof, whereby each vent unit 200 may be tilted.

Thus, the vent unit located near the front side of the vehicle may be configured such that an end thereof located near the front side of the vehicle is tilted. Also, the vent unit 200 located near the rear side of the vehicle may be configured such that an end thereof located near the rear side of the vehicle is tilted.

In one embodiment of the present disclosure, the end of the vent unit 200 that is close to the first rack unit 400 is further popped up in the downward direction of the vehicle than the opposite end thereof, which is close to the second rack unit 500.

In other words, the first projection 410 of the first rack unit 400 may move along the first curved portion 620, which is curved with a predetermined curvature in the height direction. The second projection 510 of the second rack unit 500 may move in the downward direction of the vehicle along the second curved portion 720, which is curved with a predetermined curvature in the downward direction of the vehicle.

In summary, when the first projection 410 moves along the first curved portion 620, the end of the vent unit 200 that is close to the front side of the vehicle may be tilted in the downward direction of the vehicle. Specifically, when the first projection 410 moves along the first curved portion 620, the second projection 510 may move along the second curved portion 720.

Further, when the first projection 410 and the second projection 510 are respectively located in the first curved portion 620 and the second curved portion 720, the link part 210 may be located in the second guide slot 213, which is formed so as to be curved.

In addition, the roof vent may further include a position sensor (not shown) for detecting the position of a passenger and a controller (not shown) for controlling the popup or tilting operation of the vent unit 200 in accordance with the position of the passenger.

The controller may include an illumination unit (not shown), which includes a brightness sensor (not shown) for sensing the brightness in the interior of the vehicle when a passenger rides in the vehicle and an illumination sensor (not shown) for turning light on/off in accordance with the brightness.

The position sensor may be mounted in a seat to detect the position of a passenger. When a passenger sits on the seat, the controller may determine whether to perform the popup operation or the tilting operation of the vent unit 200 in accordance with the sitting position of the passenger.

Further, the controller may be configured to interlock with an external air temperature sensor (not shown) and/or an indoor temperature sensor (not shown) of the vehicle, thereby controlling the driving of the vent assembly and controlling the amount of air that is discharged through the vent unit 200 in accordance with the temperature.

As shown in FIG. 5, a ventilation region varies depending on the operation of the vent unit 200.

Here, a ventilation region that is created by the popup operation of the vent unit 200, performed in response to a user's request irrespective of the sitting position of a passenger, may be defined as a first region.

That is, the first region is a ventilation region in which air is uniformly introduced into the interior of the vehicle in the state in which the vent unit 200 is popped up in the downward direction of the vehicle and the entire region of the vent unit 200 is opened.

Further, a ventilation region that is created by the tilting operation of the vent unit 200, performed in accordance with the sitting position of a passenger, and thus receives a larger amount of air than other regions, may be defined as a second region.

In other words, the popup operation of the vent unit 200 may create the first region, in which air is uniformly introduced into the interior of the vehicle along the vent unit 200. The tilting operation of the vent unit 200, which is performed in accordance with the position of the user or the user's request, may create the second region, in which air flow is relatively concentrated.

Still further, since the controller according to the embodiment of the present disclosure includes the roof vent and the illumination unit, which interlock with the position sensor, the controller may perform control so as to turn on the light in the region in which a passenger is present and to cause an end of the vent unit 200 that faces the passenger to be tilted.

Figure 6:
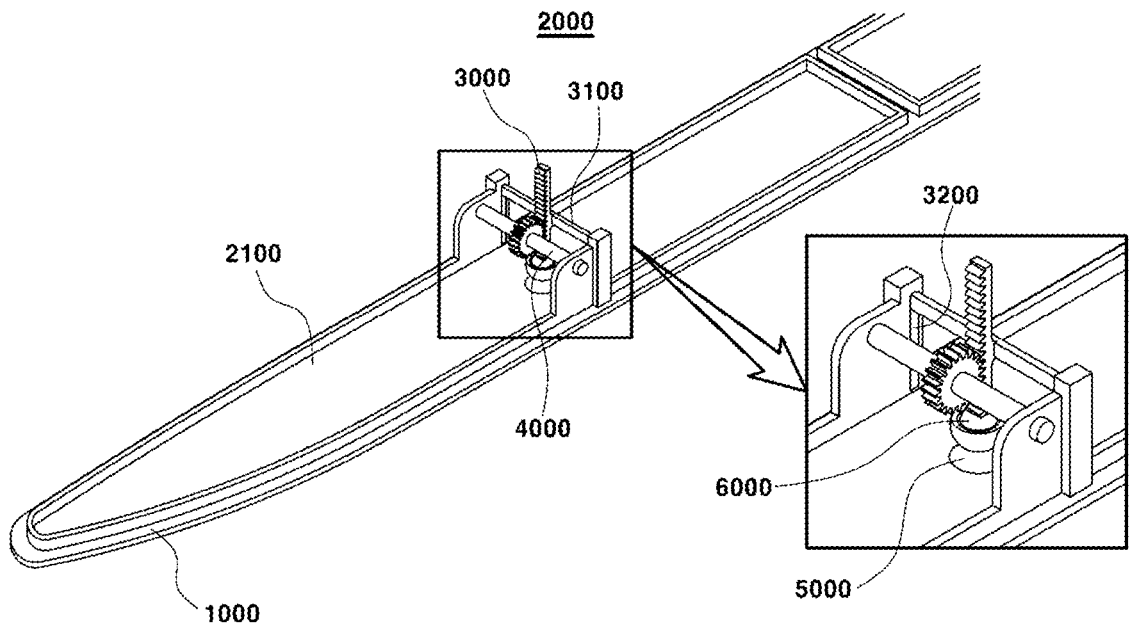
FIG. 6 is a view of a roof vent structure according to another embodiment of the present disclosure and shows the non-operating state of a vent unit.
Figure 7:
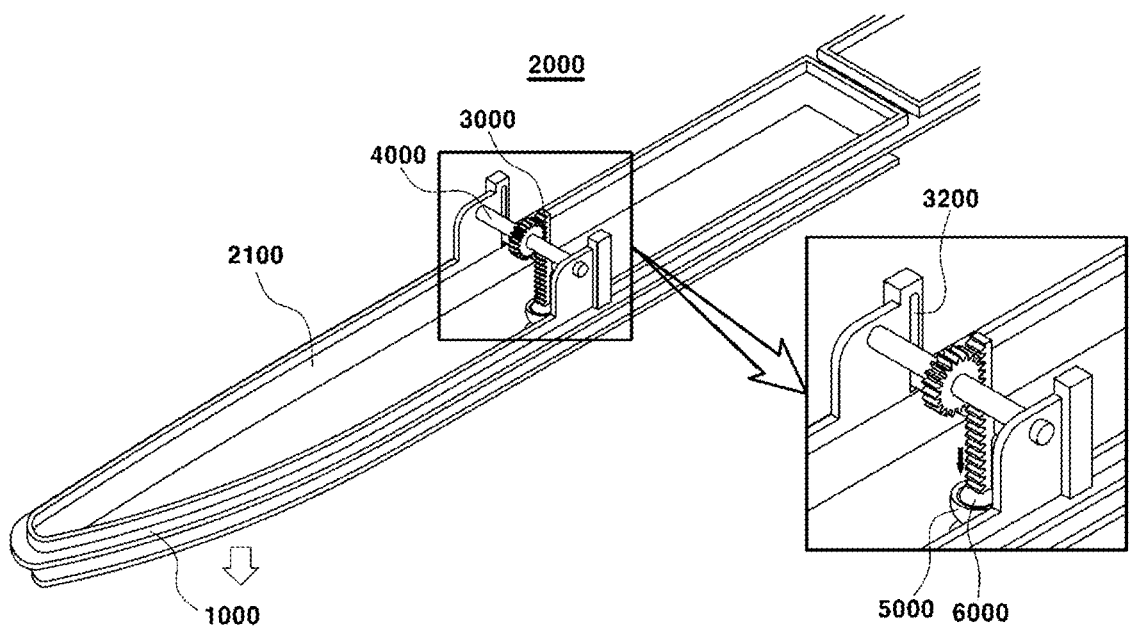
FIG. 7 is a view showing the operating state of the vent unit shown in FIG. 6.

FIG. 6 is a view of a roof vent structure according to another embodiment of the present disclosure, which shows the non-operating state of a vent unit. FIG. 7 is a view showing the operating state of the vent unit shown in FIG. 6.

A roof vent according to another embodiment of the present disclosure includes a roof 1000, a vent assembly 2000, a transmission unit 3000, an operating unit 4000, an adjusting unit 5000, and an adjusting ball 6000.

As shown in the drawings, the roof 1000 is provided with the transmission unit 3000, the operating unit 4000, the adjusting unit 5000, and the adjusting ball 6000 in order to realize the popup or tilting operation of a vent unit 2100.

Since the roof 1000 and the vent assembly 2000 in this embodiment are the same as the roof 10 and the vent assembly 20 in the previous embodiment, a detailed explanation thereof has been omitted.

The transmission unit 3000 may be mounted on the back surface of the roof 1000 or the vent assembly 2000 in order to drive the vent unit 2100. Here, the transmission unit 3000 may be implemented as a gear member that extends vertically toward the roof of the vehicle.

The transmission unit 3000, i.e. the gear member, receives a driving force and is driven to transmit the driving force to the vent unit 2100 in order to drive the vent unit 2100.

The transmission unit 3000 may be configured so as to be driven by a motor (not shown). In order to drive the transmission unit 3000, one end of the motor may be connected to one end of the transmission unit 3000. The motor, which is connected to the transmission unit 3000, may be driven by the power applied thereto from a power source mounted in the vehicle. When the transmission unit 3000 is driven by the motor, the vent unit 2100, which is integrally formed with the transmission unit 3000, may move downwards.

More specifically, the operating unit 4000 may be connected to the motor to transmit driving force to the transmission unit 3000.

Further, the transmission unit 3000 may include a guide rod 3100, which is configured to guide the transmission unit 3000 so that the transmission unit 3000, which is engaged with the operating unit 4000, is moved vertically when the vent unit 2100 performs a popup operation.

The guide rod 3100 may be configured to move vertically along a guide groove 3200, which is formed in the back surface of the vent unit 2000. The guide rod 3100 may be integrally formed with the transmission unit 3000 and thus may serve to reinforce the engagement between the transmission unit 3000 and the operating unit 4000 when the transmission unit 3000 moves vertically.

The operating unit 4000 may be engaged with one side of the transmission unit 3000 to drive the transmission 3000 so that the vent unit 2100 performs a popup operation.

The adjusting unit 5000 may be disposed on the back surface of the vent unit 2100 and may be connected to one end of the transmission unit 3000 including the adjusting ball 6000.

Specifically, the adjusting unit 5000 may be formed so as to receive the adjusting ball 6000, which is secured to the transmission unit 3000, thereby adjusting the direction in which the vent unit 2100 is tilted after being popped up.

More specifically, the adjusting unit 5000 and the adjusting ball 6000 may be coupled to each other in an interference-fit manner. A predetermined space may be formed between the adjusting unit 5000 and the adjusting ball 6000, which are coupled to each other in an interference-fit manner, so that the adjusting ball 6000 has a certain degree of freedom as to movement with respect to the adjusting unit 5000.

Further, the adjusting unit 5000 and the adjusting ball 6000 may be configured to adjust the height of the vent unit 2100 in the longitudinal direction thereof so that the vent unit 2100 is tilted in accordance with a user's request.

As is apparent from the above description, the present disclosure provides a roof vent that is capable of adjusting an airflow direction so that air is introduced, not only into a region corresponding to the mounting position of the roof vent, but also into a region distant from the mounting position of the roof vent. This selectively enables uniform introduction of air into the interior of the vehicle or concentration of airflow in a desired direction.

In addition, since the roof vent is configured to be tilted, it is possible to allow air to flow to a selected position or to a selected passenger.

In addition, since the roof vent is configured to be popped up or tilted to the interior of the vehicle, it is possible to introduce a larger amount of air into the interior of the vehicle than a roof vent configured to be popped up or tilted to the outside of the vehicle.

The above description is illustrative of the present disclosure. Further, the above disclosure is intended to illustrate and explain the example embodiments. The present disclosure may be used in various other combinations, modifications, and environments. In other words, the disclosed roof vents may be changed or modified within the scope of the concept of the embodiments disclosed herein, within the equivalent scope of the disclosure, and/or within the skill and knowledge of the art. The described embodiments illustrate the best state of the art to implement the technical idea of the present disclosure. Various changes may be made thereto as demanded for specific applications and uses of the present disclosure. Accordingly, the above description is not intended to limit the present disclosure to the embodiments. Further, the appended claims should be construed as encompassing such other embodiments.

What is claimed is:

1. A roof ventilation system comprising:
a roof disposed at an upper side of an interior of a vehicle; and
a vent assembly, the vent assembly including
at least one vent unit protruding outside the roof,
a motor applying a driving force to the vent unit, and
at least one lever arm unit applying the driving force of the motor to the vent unit, wherein the vent unit is popped up by the motor,
wherein the lever arm unit includes
a first lever arm unit to which the driving force of the motor is applied,
a second lever arm unit interlocking with the first lever arm unit, and
a first slot formed in a back surface of the vent unit to allow one end of the first lever arm unit to move to one end of the vent unit in a longitudinal direction thereof,
wherein the first slot includes a first popup position portion in which one end of the first lever arm unit is located when the vent unit is popped up,
wherein the first slot further includes a first curved portion extending from at least one end of the first popup position portion,
wherein the one end of the first lever arm unit is located in the first curved portion when the vent unit is tilted, and
wherein the end of the first lever arm unit and the end of the second lever arm unit that face each other mesh with each other through gear coupling.

2. The roof ventilation system of claim 1, further comprising:
a second slot formed in the back surface of the vent unit to allow one end of the second lever arm unit to move to an opposite end of the vent unit in the longitudinal direction thereof,
wherein the vent unit is popped up outside the roof by operation of the first lever arm unit.

3. The roof ventilation system of claim 2, wherein the second slot comprises a second popup position portion in which one end of the second lever arm unit is located when the vent unit is popped up.

4. The roof ventilation system of claim 3, wherein the second slot further comprises a second curved portion extending from at least one end of the second popup position portion, and
wherein the one end of the second lever arm unit is located in the second curved portion when the vent unit is tilted.

5. The roof ventilation system of claim 1, wherein the at least one vent unit comprises a plurality of vent units,
wherein the vent assembly comprises a windless unit disposed between the plurality of vent units, and
wherein the plurality of vent units and the windless unit are arranged in a longitudinal direction of the vehicle.

6. The roof ventilation system of claim 1, wherein the at least one vent unit comprises a plurality of vent units,
wherein the vent assembly comprises a windless unit disposed between the plurality of vent units, and
wherein the plurality of vent units and the windless unit are formed symmetrically in a width direction of the vehicle.

7. The roof ventilation system of claim 1, further comprising:
a link part formed on a back surface of the vent unit; and
a guide slot portion formed in the roof to guide a popup operation of the link part.

8. The roof ventilation system of claim 7, wherein the guide slot portion comprises:
a first guide slot portion formed vertically in a linear shape to guide movement of the link part when the vent unit is popped up; and
a second guide slot portion extending from one end of the first guide slot portion, the second guide slot portion being formed in a curved shape to guide movement of the link part when the vent unit is tilted.

9. The roof ventilation system of claim 1, further comprising:
a position sensor detecting a position of a passenger; and
a controller configured to receive a detection value from the position sensor and to control operation of an air-conditioning system in accordance with the detected position of the passenger.

* * * * *